(12) United States Patent
Yoshida

(10) Patent No.: US 11,930,207 B2
(45) Date of Patent: Mar. 12, 2024

(54) DISPLAY DEVICE, SIGNAL PROCESSING DEVICE, AND SIGNAL PROCESSING METHOD

(71) Applicant: Saturn Licensing LLC, New York, NY (US)

(72) Inventor: Kunio Yoshida, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 383 days.

(21) Appl. No.: 17/267,869

(22) PCT Filed: Aug. 8, 2019

(86) PCT No.: PCT/JP2019/031337
§ 371 (c)(1),
(2) Date: Feb. 11, 2021

(87) PCT Pub. No.: WO2020/039956
PCT Pub. Date: Feb. 27, 2020

(65) Prior Publication Data
US 2021/0176488 A1 Jun. 10, 2021

(30) Foreign Application Priority Data
Aug. 22, 2018 (JP) .................. 2018-155482

(51) Int. Cl.
*G06F 3/038* (2013.01)
*G09G 5/393* (2006.01)
*H04N 19/577* (2014.01)

(52) U.S. Cl.
CPC ........... *H04N 19/577* (2014.11); *G09G 5/393* (2013.01); *G09G 2340/125* (2013.01); *G09G 2340/16* (2013.01)

(58) Field of Classification Search
CPC ................. H04N 19/577; G09G 5/393; G09G 2340/125; G09G 2340/16
(Continued)

(56) References Cited

U.S. PATENT DOCUMENTS

2009/0184916 A1 7/2009 Miyazaki et al.
2010/0002132 A1* 1/2010 Kobayashi ............... G09G 3/20
348/E7.003
(Continued)

FOREIGN PATENT DOCUMENTS

CN 103929648 A 7/2014
EP 2234402 A2 9/2010
(Continued)

OTHER PUBLICATIONS

International Search Report for PCT/JP2019/031337 dated Oct. 21, 2019; 2 pages.
(Continued)

*Primary Examiner* — Jonathan M Blancha
(74) *Attorney, Agent, or Firm* — Lerner David LLP

(57) ABSTRACT

The present technology relates to a display device, a signal processing device, and a signal processing method which make it possible to realize interpolation more suitable for viewing when interpolating motion between original images.
Provided is a display device which includes a signal processing unit that, when an interpolation frame is generated for original frames along a time axis, the interpolation frame interpolating between the original frames, controls an interpolation rate of the interpolation frame depending on motion between the original frames in a certain direction. The present technology can be applied, for example, to a television receiver.

20 Claims, 12 Drawing Sheets

(58) Field of Classification Search
USPC .......................................................... 345/204
See application file for complete search history.

(56) References Cited

U.S. PATENT DOCUMENTS

| | | |
|---|---|---|
| 2010/0039557 A1 | 2/2010 | Mori et al. |
| 2011/0069227 A1* | 3/2011 | Kawai .................. H04N 7/0132 |
| | | 348/E7.003 |
| 2011/0234748 A1 | 9/2011 | Terashima |
| 2012/0093231 A1 | 4/2012 | Nozawa |
| 2012/0274742 A1 | 11/2012 | Seki et al. |

FOREIGN PATENT DOCUMENTS

| | | |
|---|---|---|
| JP | 2008017023 A | 1/2008 |
| JP | 201348376 A | 3/2013 |
| WO | 2008102826 A1 | 8/2008 |
| WO | 2008102827 A1 | 8/2008 |
| WO | 2010067519 A1 | 6/2010 |
| WO | 2011067869 A1 | 6/2011 |
| WO | 2011067870 A1 | 6/2011 |
| WO | 2012117461 A1 | 9/2012 |
| WO | 2012117464 A1 | 9/2012 |
| WO | 2015130616 A2 | 9/2015 |

OTHER PUBLICATIONS

Search Report dated Mar. 29, 2023 from the Office Action for Chinese Application No. 201980052826.3 dated Mar. 31, 2023, 3 pages.

* cited by examiner

FIG. 2

| DETECTION ITEM | DETECTION METHOD | TARGET INTERPOLATION RATE DETERMINATION METHOD |
|---|---|---|
| MOTION OF ENTIRE SCREEN IMAGE | MOTION VECTORS OF ENTIRE SCREEN IMAGE ARE ACCUMULATED IN EIGHT DIRECTIONS OF "LEFT DIRECTION", "UPPER LEFT DIRECTION", "UPPER DIRECTION", "UPPER RIGHT DIRECTION", "RIGHT DIRECTION", "LOWER RIGHT DIRECTION", "LOWER DIRECTION", AND "LOWER LEFT DIRECTION", AND DIRECTION IN WHICH EACH TOTAL SUM IS LARGEST IS DETERMINED TO BE DIRECTION OF MOTION OF ENTIRE SCREEN IMAGE. | TARGET INTERPOLATION RATE IS DETERMINED DEPENDING ON MOTION VECTOR TOTAL SUM OF ENTIRE SCREEN IMAGE. |
| MOTION OF OBJECT | STATIONARY AREA (FOR EXAMPLE, A% OF ENTIRE SCREEN IMAGE) IS DETECTED, AND RATIO TO ENTIRE SCREEN IMAGE IS CALCULATED FOR MOTION VECTOR TOTAL SUM S WHICH IS LARGEST IN ABOVE EIGHT DIRECTIONS TO OBTAIN MOTION VECTOR TOTAL SUM S' OF OBJECT (S' = S × 100/(100 − A)). | TARGET INTERPOLATION RATE IS DETERMINED DEPENDING ON MOTION VECTOR TOTAL SUM S' OF OBJECT. |

FIG. 4

| VIDEO CONTENT | INTERPOLATION RATE RANGE TO BE USED |
|---|---|
| MOVIE | 40~90% |
| ANIMATED MOVIE | 50~90% |
| ANIMATED TV SHOW | 80~100% |
| DRAMA | 70~90% |
| SPORTS | 90~100% |
| OTHERS | 80~95% |

FIG. 8

| DETECTION ITEM | DETECTION METHOD | TARGET INTERPOLATION RATE DETERMINATION METHOD |
|---|---|---|
| SHAKE OF ENTIRE SCREEN IMAGE | IT IS DETERMINED THAT ENTIRE SCREEN IMAGE IS SHAKING IN CASE WHERE THERE IS, AMONG FOUR TYPES OF COMBINATION INCLUDING DIAGONAL DIRECTIONS, I.E., "LEFT AND RIGHT DIRECTIONS", "UPPER LEFT AND LOWER RIGHT DIRECTIONS", "UPPER AND LOWER DIRECTIONS", AND "UPPER RIGHT AND LOWER LEFT DIRECTIONS", COMBINATION IN WHICH HIGH AND LOW LEVELS OF MOTION VECTOR AMOUNTS OF ENTIRE SCREEN IMAGE ARE REVERSED IN EVERY SEVERAL V. FURTHERMORE, SHAKE AMOUNT OF ENTIRE SCREEN IMAGE CAN BE OBTAINED FROM MOTION VECTOR AMOUNT OF COMBINATION WITH WHICH ENTIRE SCREEN IMAGE IS DETERMINED TO BE SHAKING. | TARGET INTERPOLATION RATE IS DETERMINED DEPENDING ON SHAKE AMOUNT OF ENTIRE SCREEN IMAGE. |
| SHAKE OF OBJECT | STATIONARY AREA (FOR EXAMPLE, A% OF ENTIRE SCREEN IMAGE) IS DETECTED. AND RATIO TO ENTIRE SCREEN IMAGE IS CALCULATED FOR SHAKE AMOUNT T WHICH IS LARGEST IN ABOVE FOUR TYPES OF COMBINATION TO OBTAIN SHAKE AMOUNT T' OF OBJECT (T' = T × 100/(100 − A)). | TARGET INTERPOLATION RATE IS DETERMINED DEPENDING ON SHAKE AMOUNT T' OF OBJECT. |

DISPLAY DEVICE, SIGNAL PROCESSING DEVICE, AND SIGNAL PROCESSING METHOD

CROSS-REFERENCE TO RELATED APPLICATIONS

This application is a national phase entry under 35 U.S.C. § 371 of International Application No. PCT/JP2019/031337 filed Aug. 8, 2019, which claims the priority from Japanese Patent Application No. 2018-155482 filed in the Japanese Patent Office on Aug. 22, 2018, the entire contents of which are hereby incorporated by reference.

TECHNICAL FIELD

The present technology relates to a display device, a signal processing device, and a signal processing method, and particularly relates to a display device, a signal processing device, and a signal processing method which make it possible to realize interpolation more suitable for viewing when interpolating motion between original images.

BACKGROUND ART

As one of signal processes for improving image quality in display devices such as television receivers, frame rate conversion using motion compensation is known.

As frame rate conversion of this type, for example, a method is known in which one or multiple interpolation frames obtained by interpolating videos of the original frames using motion compensation are added between original frames adjacent to each other along a time axis (see, for example, Patent Document 1).

CITATION LIST

Patent Document

Patent Document 1: WO2008/102827

SUMMARY OF THE INVENTION

Problems to be Solved by the Invention

By the way, when interpolating motion between original frames by an interpolation frame, it is required to realize interpolation more suitable for viewing.

The present technology has been made in view of such a situation, and aims to make it possible to realize interpolation more suitable for viewing when interpolating motion between original images.

Solutions to Problems

The display device of one aspect of the present technology is a display device which includes a signal processing unit that, when an interpolation frame is generated for original frames along a time axis, the interpolation frame interpolating between the original frames, controls an interpolation rate of the interpolation frame depending on motion between the original frames in a certain direction.

In the display device of one aspect of the present technology, when an interpolation frame is generated for original frames along a time axis, the interpolation frame interpolating between the original frames, an interpolation rate of the interpolation frame is controlled depending on motion between the original frames in a certain direction.

The signal processing device of one aspect of the present technology is a signal processing device which includes an interpolation rate control unit that, when an interpolation frame is generated for original frames along a time axis, the interpolation frame interpolating between the original frames, controls an interpolation rate of the interpolation frame depending on motion between the original frames in a certain direction.

The signal processing method of one aspect of the present technology is a signal processing method in which when an interpolation frame is generated for original frames along a time axis, the interpolation frame interpolating between the original frames, a signal processing device controls an interpolation rate of the interpolation frame depending on motion between the original frames in a certain direction.

In the signal processing device and the signal processing method of one aspect of the present technology, when an interpolation frame is generated for original frames along a time axis, the interpolation frame interpolating between the original frames, an interpolation rate of the interpolation frame is controlled depending on motion between the original frames in a certain direction.

Note that the display device and the signal processing device of one aspect of the present technology may be independent devices, or may be internal blocks constituting one device.

BRIEF DESCRIPTION OF DRAWINGS

FIG. 2 is a diagram illustrating examples of a motion detection method and a target interpolation rate determination method.

FIG. 4 is a diagram illustrating an example of an interpolation rate range for each type of video content.

FIG. 8 is a diagram illustrating examples of a shake detection method and a target interpolation rate determination method.

MODE FOR CARRYING OUT THE INVENTION

Hereinafter, embodiments of the present technology will be described with reference to the drawings. Note that the descriptions will be made in the following order.

1. First Embodiment
2. Second Embodiment
3. Modifications
4. Configuration of Computer

1. First Embodiment (Example Configuration of Signal Processing Device)

Figure 1:
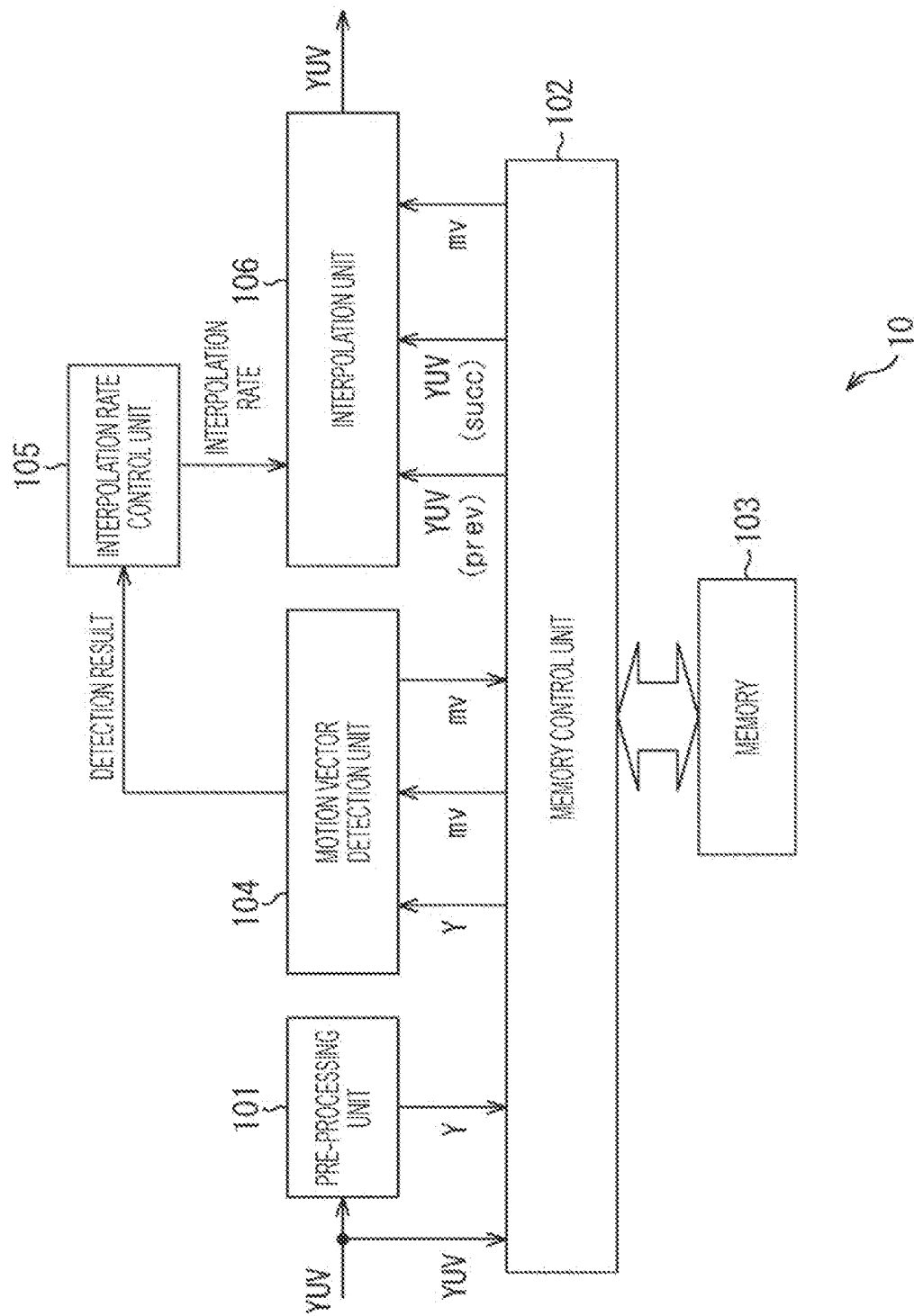
FIG. 1 is a block diagram illustrating an example configuration of a signal processing device to which the present technology is applied.

FIG. 1 is a block diagram illustrating an example configuration of a signal processing device to which the present technology is applied.

In FIG. 1, a signal processing device 10 is housed, for example, in a television receiver, performs a signal process on a video signal which has undergone processes of channel selection, decoding, and the like by a tuner, a decoder, and the like provided at a former stage thereof, and outputs a video signal obtained as a result of the signal process to a circuit (circuit related to video display) at a subsequent stage.

The signal processing device 10 includes a pre-processing unit 101, a memory control unit 102, a memory 103, a motion vector detection unit 104, an interpolation rate control unit 105, and an interpolation unit 106.

In the signal processing device 10, digital component signals YUV are input as video signals, supplied to the pre-processing unit 101, and sequentially written to the memory 103 via the memory control unit 102.

Here, the digital component signals YUV are each a video signal including a luminance signal Y and color-difference signals U and V. Furthermore, the digital component signals YUV are processed on a frame basis in the signal processing device 10, and a frame of an original image of the video signal is referred to as an original frame and distinguished from an interpolation frame described later.

The pre-processing unit 101 performs a process of separating the luminance signals Y from the digital component signals YUV. The luminance signals Y separated by the pre-processing unit 101 are sequentially written to the memory 103 via the memory control unit 102.

The luminance signals Y written to the memory 103 are sequentially read by the memory control unit 102 and supplied to the motion vector detection unit 104. The motion vector detection unit 104 performs a motion vector detection process by block matching using the luminance signal Y of a current original frame and the luminance signals Y of previous and succeeding original frames of the current original frame.

A motion vector my of each of the original frames detected by the motion vector detection unit 104 is written to the memory 103 via the memory control unit 102 and then read from the memory 103 to be returned to the motion vector detection unit 104 for reference in detection of a motion vector in the following original frame.

The memory control unit 102 reads the digital component signals YUV written to the memory 103 on a predetermined frame basis suitable for the interpolation process by the interpolation unit 106, and supplies the digital component signals YUV together with the motion vector my to the interpolation unit 106.

Here, for example, the memory control unit 102 reads two series of digital component signals YUV written to the memory 103. Moreover, the memory control unit 102 reads a motion vector my indicating motion between the two original frames. The two series of digital component signals YUV (prev and succ) and the motion vector my thus read are supplied to the interpolation unit 106.

Furthermore, the motion vector detection unit 104 detects motion of an entire screen image or an object on the basis of the detected motion vector my of each of the original frames, and a result of the motion detection is supplied to the interpolation rate control unit 105. However, it is assumed that the result of the motion detection supplied to the interpolation rate control unit 105 is synchronized with the digital component signals YUV (prev and succ) and the motion vector my supplied to the interpolation unit 106.

The interpolation rate control unit 105 includes, for example, a central processing unit (CPU). The interpolation rate control unit 105 controls the interpolation rate of an interpolation frame on the basis of the result of the motion detection supplied from the motion vector detection unit 104. For example, the interpolation rate control unit 105 determines a target interpolation rate which is a target of the interpolation rate on the basis of a motion amount detected from the original frames, and controls the interpolation rate stepwise so as to gradually approach the determined target interpolation rate.

The interpolation rate control unit 105 controls the interpolation rate depending on the motion between the original frames in a certain direction, which will be described later in detail. Here, video scenes are detected, for example, in a case where a screen image is panned in a certain direction, a case where a screen image is zoomed in or out, or a case where a screen image is rotated, and the interpolation rate is controlled depending on the video scenes.

Here, the interpolation frame is a frame for interpolating between original frames along the time axis. For example, here, in a case where an original frame (prev) and an original frame (succ) along the time axis are input to the interpolation unit 106 as the digital component signals YUV (prev and succ), the interpolation rate of an interpolation frame for interpolating between the original frame (prev) and the original frame (succ) is controlled.

Furthermore, the interpolation rate is a rate indicating the degree of interpolation of an interpolation frame inserted (added) between original frames along the time axis. For example, in a case where a frame rate is converted from 24 Hz to 120 Hz, four interpolation frames are required between the original frames (prev and succ), but a position of an object in the interpolation frames inserted (added) between the original frames can be changed by changing the interpolation rate.

That is, in this example, the interpolation rate is defined as 100% when four interpolation frames are generated assuming that a positional change between the original frames has occurred in an even movement, the even movement is not obtained in a case of decreasing the interpolation rate, for example, to 50% or 25%, the interpolation frames are approximated to the original frames as the interpolation rate is lowered, and the interpolation rate is defined as 0% when the interpolation frames become identical with the original frames.

The digital component signals YUV (prev and succ) and the motion vector my from the memory control unit 102 and the interpolation rate from the interpolation rate control unit 105 are input to the interpolation unit 106 in synchronization. The interpolation unit 106 generates an interpolation frame for interpolating between previous and succeeding original frames (prev and succ) on the basis of the interpolation rate to perform interpolation, and outputs the digital component signals YUV after the interpolation to a circuit at a subsequent stage.

Here, for example, the interpolation frame is generated as follows. That is, on the basis of parameters of an interpolation position depending on the interpolation rate of a video in each interpolation frame and the motion vector my between the previous and succeeding original frames (prev and succ), addresses of pixels of the previous and succeeding original frames (prev and succ) used for calculating pixel values of the interpolation frame are calculated, and then pixel values of the addresses are weighted depending on the interpolation position depending on the interpolation rate, and thereby interpolation is performed and the interpolation frame is generated.

In the signal processing device 10 configured as described above, when the interpolation frame is generated for (inserted between) the original frames (prev and succ) along the time axis, the interpolation rate of the interpolation frame is determined depending on a scene specified from motion between the original frames (prev and succ) in a certain direction (for example, a motion amount detected from the original frames), and on the basis of the determined interpolation rate, the interpolation frame is generated for (inserted between) the original frames (prev and succ).

(Motion Detection Method and Interpolation Rate Determination Method)

FIG. 2 is a diagram illustrating examples of a motion detection method based on a motion vector and a target interpolation rate determination method depending on a result of the motion detection.

As illustrated in FIG. 2, there are two types of detection items detected from original frames, for example, the motion of an entire screen image and the motion of an object included in the screen image. Note that, here, an area of the entire screen image corresponds to an area which corresponds to each original frame.

For the detection of the motion of the entire screen image, for example, the following detection method can be used. That is, motion vectors of the entire screen image are accumulated in each of eight directions of a left direction, an upper left direction, an upper direction, an upper right direction, a right direction, a lower right direction, a lower direction, and a lower left direction, and a specific direction in which a motion vector total sum, which is largest among motion vector total sums in respective directions obtained as a result of the accumulation, is obtained is determined to be a direction of the motion of the entire screen image.

In such a case, the interpolation rate control unit 105 determines the target interpolation rate depending on the detected motion vector total sum of the entire screen image. Here, for example, on the basis of the motion vector total sum in the specific direction depending on the determination result of the direction of the motion of the entire screen image, video scenes are detected, for example, in a case where the entire screen image is panned in a certain direction, a case where the entire screen image is zoomed in or out, or a case where the entire screen image is rotated, and the target interpolation rate is determined depending on a motion amount of the video scene in a certain direction (motion amount of the entire screen image).

Furthermore, for the detection of the motion of the object, for example, the following detection method can be used. That is, a motion vector total sum S, which is largest among motion vector total sums in the above eight directions (the left direction, the upper left direction, the upper direction, the upper right direction, the right direction, the lower right direction, the lower direction, and the lower left direction), can be employed as a motion vector total sum S' of the object, but here, a value thereof is translated (converted) into a value for the entire screen image.

For example, because it is possible to calculate a ratio of an area corresponding to the object as a moving object to the entire screen image by detecting a stationary area in the entire screen image (for example, an area which accounts for A % of the area of the entire screen image), the motion vector total sum S can be converted into the motion vector total sum S' of the object by using the ratio. More specifically, the motion vector total sum S' of the object satisfies a relationship of the following formula (1).

$$S' = S \times 100/(100-A) \qquad (1)$$

In such a case, the interpolation rate control unit 105 determines the target interpolation rate depending on the detected motion vector total sum S' of the object. Here, for example, on the basis of the motion vector total sum S' of the object, a video scene which is obtained by a fixed camera and in which an object such as a person or a vehicle is moving is detected, and the target interpolation rate is determined depending on a motion amount in a certain direction (motion amount of the object).

Note that although the motion of the entire screen image and the motion of the object have been described here as detection items, the target interpolation rate can be determined depending on at least one of the motion amount of the entire screen image or the motion amount of the object. Furthermore, the motion of the entire screen image and the motion of the object are merely examples of parameters depending on video scenes, and other parameters may be used.

(First Interpolation Rate Control Process)

Figure 3:
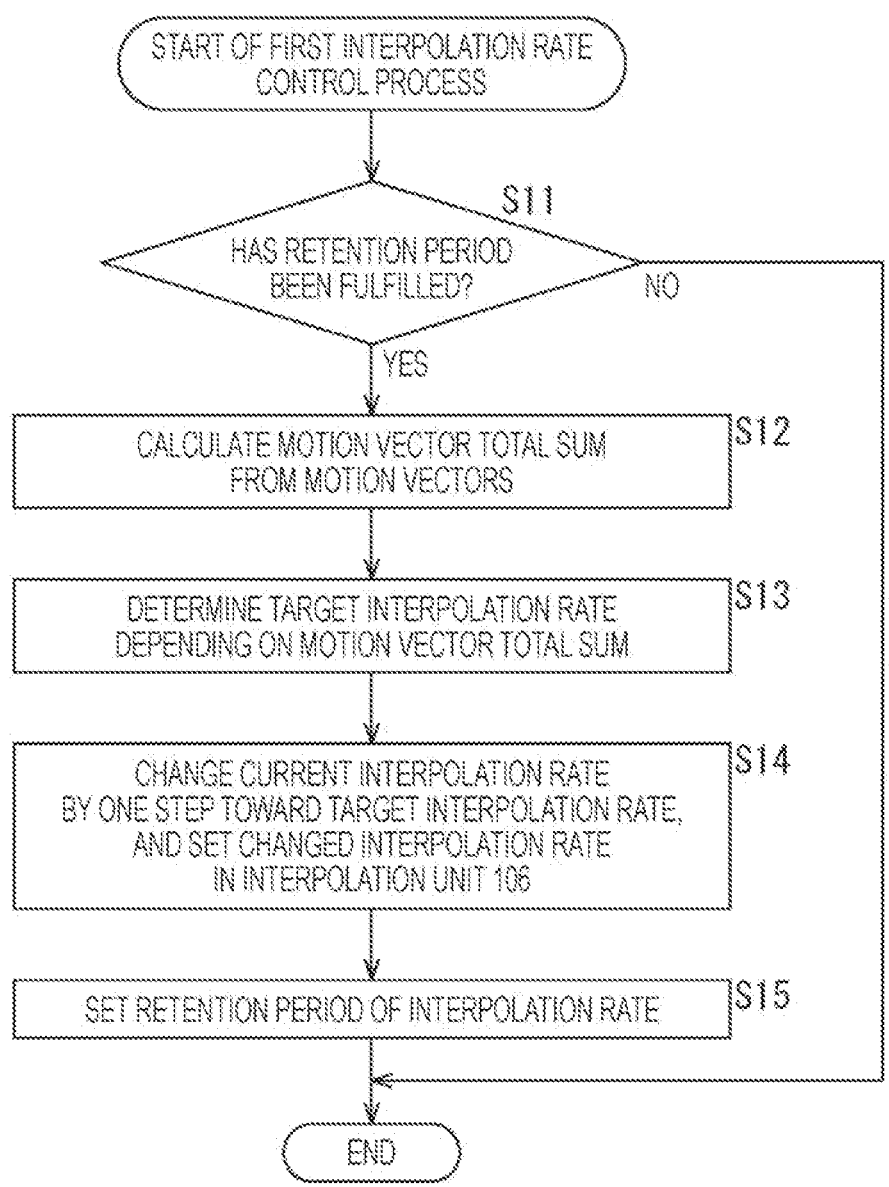
FIG. 3 is a flowchart explaining a flow of a first interpolation rate control process.

FIG. 3 is a flowchart explaining a flow of a first interpolation rate control process executed by the interpolation rate control unit 105 of FIG. 1.

In step S11, the interpolation rate control unit 105 determines whether or not the interpolation rate (current interpolation rate) set in the interpolation unit 106 has fulfilled a retention period. If it is determined in step S11 that the current interpolation rate has fulfilled the retention period, the process proceeds to step S12. Note that in this determination process, for example, timing of a vertical synchronization signal (V: Vertical Sync) such as 10 V is determined.

In step S12, the interpolation rate control unit 105 calculates the motion vector total sum on the basis of the motion vectors detected by the motion vector detection unit 104. Here, as illustrated in the detection method of FIG. 2, for example, the motion vector total sum of the entire screen image or the motion vector total sum of the object is obtained.

In step S13, the interpolation rate control unit 105 determines a target interpolation rate depending on the calculated motion vector total sum. Here, as illustrated in the determination method of FIG. 2, for example, the target interpolation rate depending on the motion vector total sum of the entire screen image, or the target interpolation rate depending on the motion vector total sum of the object is determined.

In step S14, the interpolation rate control unit 105 changes the current interpolation rate by one step toward the determined target interpolation rate, and sets the changed interpolation rate in the interpolation unit 106. Here, for example, in a case where an interpolation rate of 100% is determined as the target interpolation rate and 10% is set as an increment of change, if an interpolation rate set in the interpolation unit 106 is 60%, the interpolation rate is advanced by one step and is changed to 70%.

In step S15, the interpolation rate control unit 105 sets the retention period of the interpolation rate. Here, for example, timing of a vertical synchronization signal such as 10 V is set as the retention period of the interpolation rate used in the determination process of step S11.

When the process of step S15 is ended, the process proceeds to END. Note that if it is determined in step S11 that the retention period such as the timing of 10 V has not been fulfilled, steps S12 to S15 are skipped and the process proceeds to END. Here, the processes from START to END are performed within 1 V, and are started again from START at the next V.

That is, for example, if the processes of steps S11 to S15 are repeated at a predetermined timing such as 1 V and a predetermined retention period such as 10 V has been fulfilled ("YES" in S11), the target interpolation rate depending on the motion vector total sum is determined (S13), the current interpolation rate is changed stepwise, one step at a time, so as to gradually approach the target interpolation rate, and the changed interpolation rate is set in the interpolation unit 106 (S14).

For example, if the target interpolation rate is determined to be 100% and the current interpolation rate is 60%, the interpolation rate is set to 70% and then the current interpolation rate is changed stepwise (for example, in increments of an interpolation rate of 10%) at timing of every 10 V, for example, to 80% and then to 90%, so as to gradually approach the target interpolation rate of 100%, and finally the current interpolation rate is changed to 100%.

Furthermore, the target interpolation rate is not limited to a fixed value, and can be a variable value. For example, in the above example, in a case where a video scene is switched and the target interpolation rate is changed to 70% at the timing when the current interpolation rate is changed to 90% toward the target interpolation rate of 100%, the current interpolation rate is changed stepwise (for example, in increments of an interpolation rate of 10%), for example, to 90%, to 80%, and then to 70%, toward the changed target interpolation rate of 70%.

The flow of the first interpolation rate control process has been described above. In this first interpolation rate control process, when an interpolation frame is generated for original frames along the time axis, the interpolation rate of the interpolation frame is controlled depending on the motion between the original frames in a certain direction. More specifically, when controlling the interpolation rate, the target interpolation rate is determined on the basis of a motion amount detected from the original frames, and the interpolation rate is controlled on the basis of the determined target interpolation rate.

Here, FIG. 4 illustrates an example of an interpolation rate range for each type of video content. For example, in a case where the type of video content is a movie, the interpolation rate control unit 105 performs the first interpolation rate control process, and controls the interpolation rate of the interpolation frame to be changed within an interpolation rate range of 40 to 90%. That is, the interpolation rate range is a range in which the interpolation rate determined for each type of video content can be changed.

Furthermore, in FIG. 4, for example, in a case where the type of video content is an animated movie, the interpolation rate is controlled within an interpolation rate range of 50 to 90%, and the interpolation rate is controlled within an interpolation rate range of 80 to 100% in a case where the type thereof is an animated TV show, within an interpolation rate range of 70 to 90% in a case where the type thereof is a drama, within an interpolation rate range of 90 to 100% in a case where the type thereof is sports, and within an interpolation rate range of 60 to 95% in a case where the type thereof is any other type than those described above.

For example, in the case of a movie, the interpolation rate can be changed within a range from a low interpolation rate such as 40% to an interpolation rate of less than 100% such as 90% in order to maintain the texture of a low frame rate. On the other hand, for example, in the case of more realistic video content such as sports, the interpolation rate can be changed within a range where the interpolation rate is higher. In particular, in the case of sports, imaging is often performed at a frame rate of 60 Hz or the like, and by reducing the number of interpolation frames to be interpolated, a feeling of strangeness in appearance due to interpolation and an error at a time of generation of interpolation frames are reduced. Consequently, it is desirable to set, as a range where the interpolation rate can be changed, a range where the interpolation rate is higher, for example, an interpolation rate range of 90 to 100%.

Figure 5:
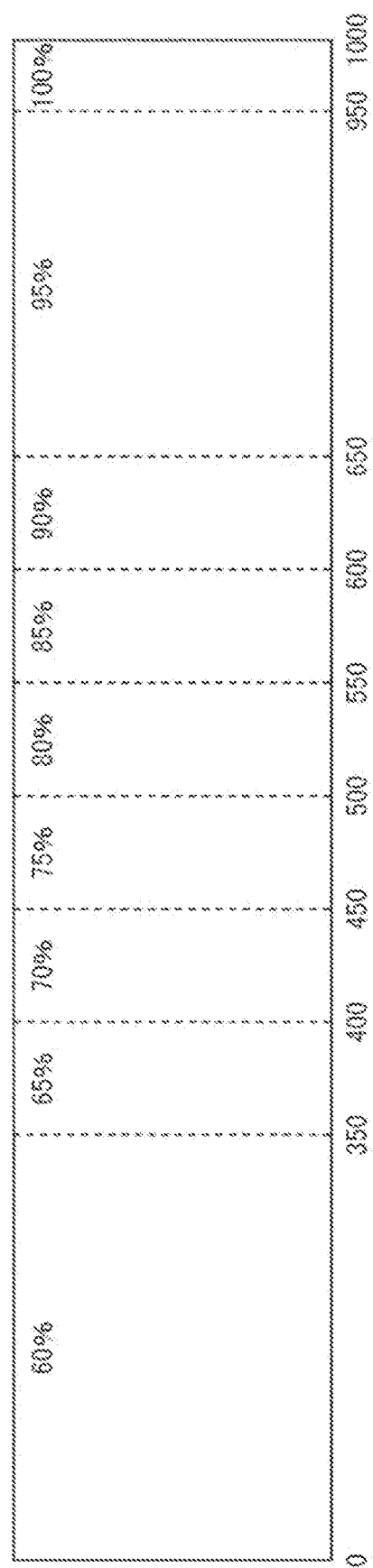
FIG. 5 is a diagram illustrating an example of transition of an interpolation rate depending on a motion amount.

Furthermore, FIG. 5 illustrates an example of transition of an interpolation rate depending on a motion amount. Note that in FIG. 5, the horizontal axis represents a motion amount such as the motion of the entire screen image in a certain direction (the amount of detected panning), for example. Here, for example, with the use of an interpolation rate such as an interpolation rate of 60% as reference, it is possible to perform control to increase the interpolation rate as the motion amount represented by the horizontal axis increases.

Here, in a case where the interpolation rate is high, artificial generation of the interpolation frames causes problems of a feeling of strangeness in appearance perceived by a user and an error at a time of generation thereof, while in a case where the interpolation rate is low, there is a problem that a judder (a phenomenon that an image looks shaking) becomes conspicuous. In particular, as for scenes in which a judder is conspicuous, for example, there may be a case where the entire screen image is panned monotonically in a certain direction, a case where the entire screen image is zoomed in or out, a case where the entire screen image is rotated, and other cases.

Therefore, in the present technology, control is performed to increase the interpolation rate (toward the target interpolation rate) by detecting a scene in which a judder is conspicuous such as a panned scene, for example, on the basis of an interpolation rate (for example, an interpolation rate of 60%) in which the feeling of strangeness in appearance perceived by the user or an error is relatively inconspicuous. As a result, for example, in the case of a movie or the like, it is possible to reduce a judder in a scene in which the judder is conspicuous and stressful while leaving an impression as a film signal, and to display a video more easily viewable for the user.

(Interpolation Process)

Figure 6:
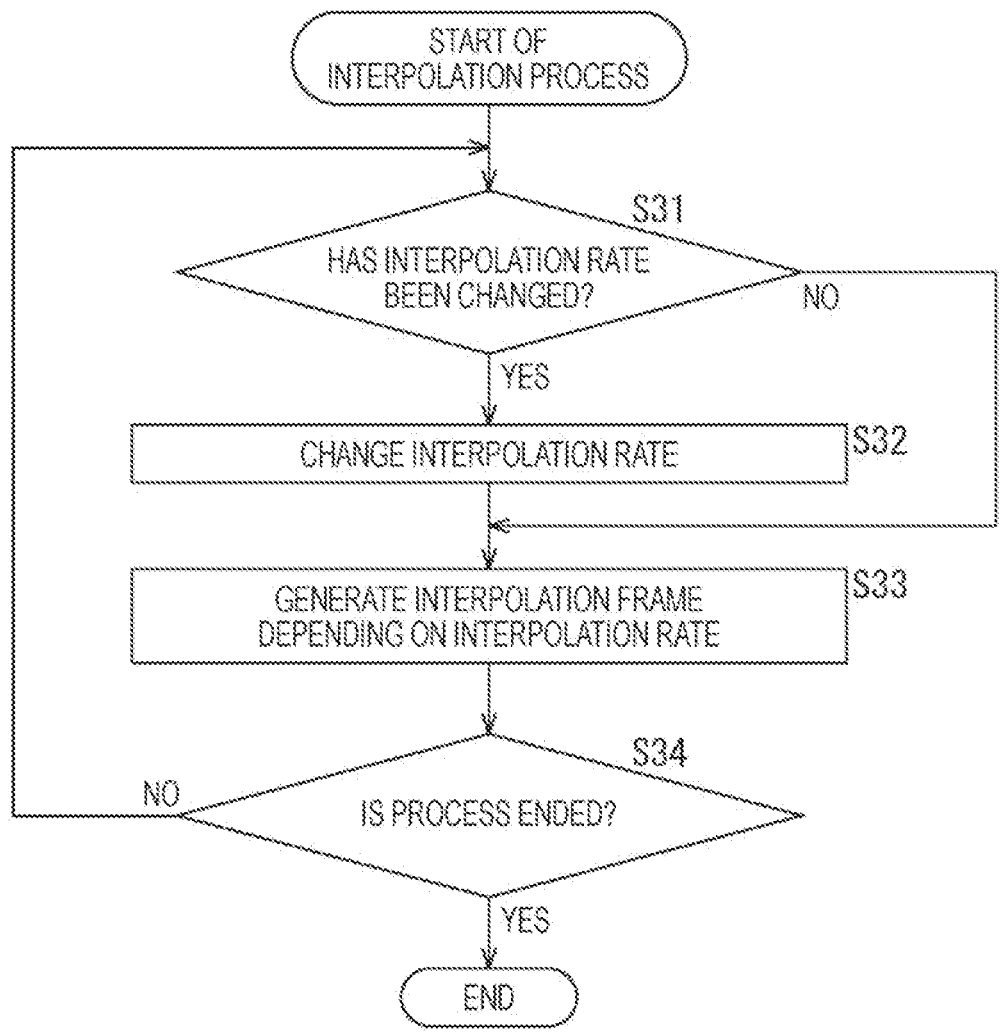
FIG. 6 is a flowchart explaining a flow of an interpolation process.

FIG. 6 is a flowchart explaining a flow of an interpolation process executed by the interpolation unit 106 of FIG. 1.

In step S31, the interpolation unit 106 determines whether or not the interpolation rate set by the interpolation rate control unit 105 has been changed. If it is determined in step S31 that the interpolation rate has been changed, the process proceeds to step S32.

In step S32, the interpolation unit 106 changes the current interpolation rate in accordance with the control from the interpolation rate control unit 105. Here, corresponding to the process of step S14 of FIG. 3, the current interpolation rate is changed one step at a time toward the target interpolation rate when a predetermined retention period such as 10 V has been fulfilled, and the changed interpolation rate is set in the interpolation unit 106.

When the process of step S32 is ended, the process proceeds to step S33. Furthermore, if it is determined in step S31 that the interpolation rate has not been changed, step S32 is skipped and the process proceeds to step S33.

In step S33, the interpolation unit 106 generates an interpolation frame depending on the interpolation rate set by the interpolation rate control unit 105 on the basis of the digital component signals YUV (prev and succ) and the motion vector my from the memory control unit 102.

Here, interpolation frames the number of which is depending on the frame rate conversion are inserted between the original frames (prev and succ). On the basis of the interpolation rate set by the interpolation rate control unit 105, as the interpolation rate decreases, an interpolation frame which is further approximated to the original frame is generated.

When the process of step S33 is ended, the process proceeds to step S34. In step S34, it is determined whether or not to end the process.

If it is determined in step S34 not to end the process, the process returns to step S31, and the processes of steps S31 to S34 are repeated. By repeating the processes of steps S31 to S34, the interpolation rate set in the interpolation unit 106 is changed stepwise so as to gradually approach the target interpolation rate, and an interpolation frame depending on the changed interpolation rate is generated.

Note that if it is determined in step S34 to end the process, the interpolation process is ended.

The flow of the interpolation process has been described above. In this interpolation process, when an interpolation frame is generated for original frames along the time axis, an interpolation frame depending on the interpolation rate set by the above first interpolation rate control process (process of step S14 of FIG. 3) is generated.

Figure 7:
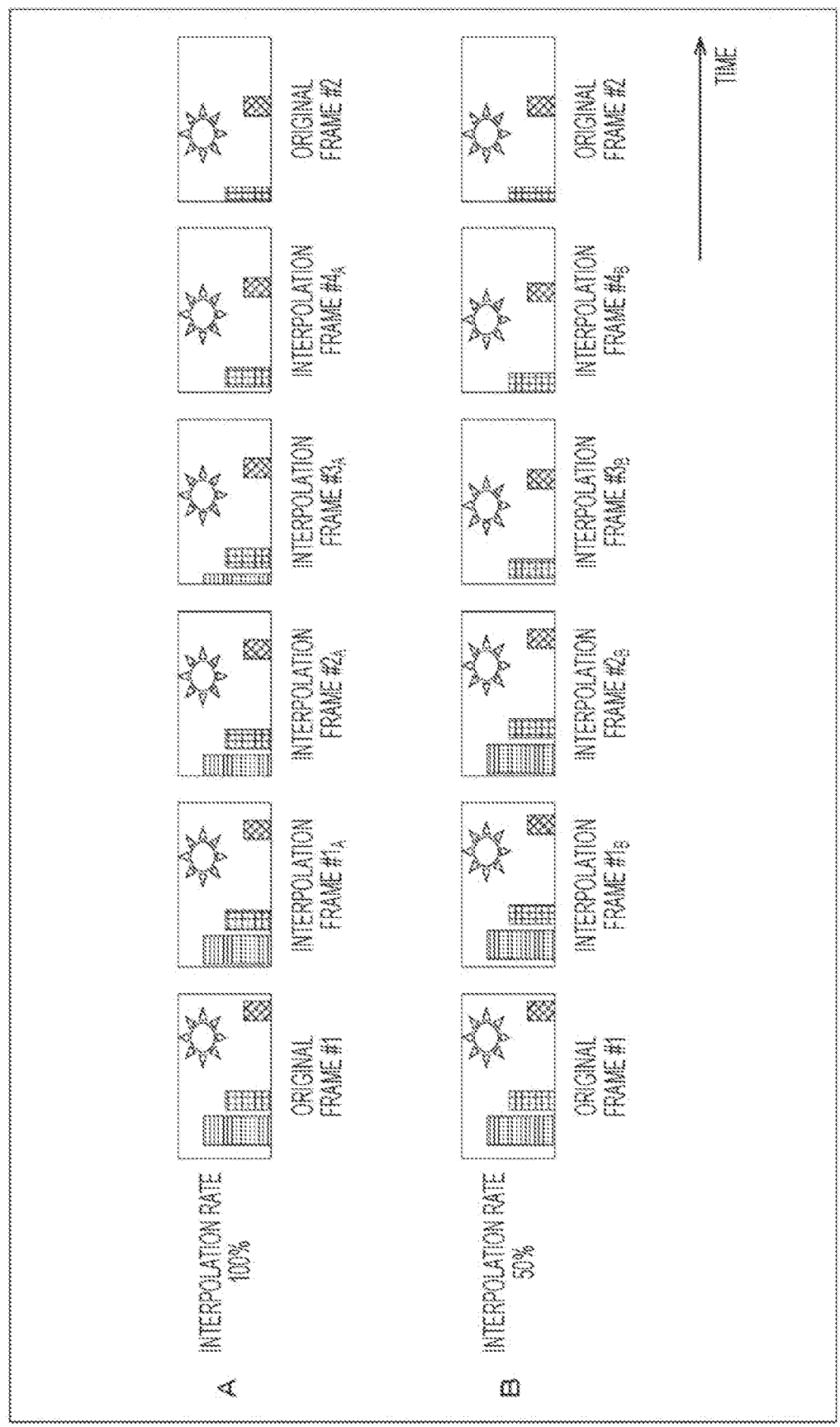
FIG. 7 is a diagram illustrating examples of display of interpolation frames depending on the interpolation rate.

Here, FIG. 7 illustrates examples of display of interpolation frames depending on the interpolation rate. Note that A of FIG. 7 illustrates a case where the interpolation rate is 100%, while B of FIG. 7 illustrates a case where the interpolation rate is 50%. Furthermore, in FIG. 7, a direction of time is a direction from the left side to the right side in the figure.

For example, in a case where the frame rate is converted from 24 Hz to 120 Hz, it is necessary to insert four interpolation frames between original frames along the time axis, so that interpolation frames #1 to #4 are inserted between the original frame #1 and the original frame #2 in each of A of FIG. 7 and B of FIG. 7.

Here, in A of FIG. 7, in a case where the interpolation rate is 100%, an interpolation frame $\#1_A$, an interpolation frame $\#2_A$, an interpolation frame $\#3_A$, and an interpolation frame $\#4_A$ are each generated assuming that a positional change between the original frame #1 and the original frame #2 has occurred in an even movement. More specifically, in A of FIG. 7, in a case where the original frames #1 and #2 are focused on and objects are found to be moving in a direction from the right to the left in the screen image, when focusing on the interpolation frames $\#1_A$ to $\#4_A$ interpolated between the original frames #1 and #2, the objects in the screen image are found to be moving evenly in a direction from the right to the left in the screen image for each interpolation frame.

While in B of FIG. 7, in a case where the interpolation rate is 50%, such an even movement as in the above case where the interpolation rate is 100% is not obtained. That is, in the case where the interpolation rate is 50%, among four interpolation frames $\#1_B$ to $\#4_B$ inserted between the original frames #1 and #2, two interpolation frames $\#1_B$ and $\#2_B$ approximate to the original frame #1 are images approximate to the original frame #1 by 50% as compared to the case where the interpolation rate is 100%, while two interpolation frames $\#3_B$ and $\#4_B$ approximate to the original frame #2 are images approximate to the original frame #2 by 50% as compared to the case where the interpolation rate is 100%.

Moreover, although not illustrated, in a case where the interpolation rate is 25%, two interpolation frames #1 and #2 approximate to the original frame #1 are images approximate to the original frame #1 by 50% as compared to the case where the interpolation rate is 50%, while two interpolation frames #3 and #4 approximate to the original frame #2 are images approximate to the original frame #2 by 50% as compared to the case where the interpolation rate is 50%.

Then, when the interpolation rate becomes 0%, the two interpolation frames #1 and #2 approximate to the original frame #1 are each an image identical with the original frame #1, while the two interpolation frames #3 and #4 approximate to the original frame #2 are each an image identical with the original frame #2. In other words, in a case where the interpolation rate is 0%, three original frames #1 and three original frames #2 are displayed in order (the original frames #1, #1, #1, #2, #2, and #2 are displayed in this order).

As described above, in the first embodiment, when the interpolation frames (for example, the four interpolation frames #1, #2, #3, and #4) are generated for the original frames (for example, the original frames #1 and #2) along the time axis, the target interpolation rate is determined on the basis of a motion amount detected from the original frames (for example, the motion of the entire screen image or the motion of the objects), and the interpolation rate of the interpolation frames is controlled on the basis of the determined target interpolation rate.

Here, for example, in a case of a film signal of a movie or the like, if interpolation is performed at interpolation positions obtained by evenly dividing the magnitude of motion in a video between the original frames, a judder is significantly reduced to make the motion in the video very smooth. As a result, users who are accustomed to a judder in a film signal may get an impression that it is not like a film signal, or that a sense of speed and a sense of urgency are reduced. While in a panned scene or the like in which the entire screen image moves, a judder is more conspicuous, and thus some users may feel stressed.

On the other hand, in the present technology, it is possible to realize interpolation more easily viewable when interpolating the motion of the original frames by performing control to change the interpolation rate depending on video scenes, and therefore, for example, in the case of a movie, it is possible to reduce a judder in a scene in which the judder is conspicuous and stressful to thereby provide a video more easily viewable, while leaving an impression as a film signal.

Furthermore, in a case where control is performed to change the interpolation rate depending on video content, if the interpolation rate for each video content is fixed (for example, the interpolation rate for a movie is fixed at X % and the interpolation rate for an animated show is fixed at Y %), it is not possible to perform control corresponding to scenes in which it is preferable to include a judder or scenes in which it is preferable to include no judder, for example.

On the other hand, in the present technology, it is possible to perform control to change a range in which the interpolation rate can be moved depending on the type of video content when performing the control to change the interpolation rate depending on video scenes, which makes it possible to set an interpolation rate suitable for each video content, and to provide a video more easily viewable by changing the interpolation rate depending on scenes.

Note that in Patent Document 1 described above, the amount of process during an imaging blur suppression process is changed depending on reliability at a time of detecting a motion vector, or a gain by which the motion vector is multiplied is changed depending on the reliability. On the other hand, in the present technology, control is performed so that a case where the screen image faces in a certain direction or a case where a main object faces in a certain direction is detected and the interpolation rate is made to be variable, regardless of the reliability.

2. Second Embodiment

By the way, for example, even in a case of a low frame rate video signal, there are scenes in which an entire screen image shakes, and scenes in which a main object shakes, which are scenes with a sense of speed and a sense of urgency, and when an interpolation rate is controlled in those scenes, it is required to perform control so that the interpolation rate does not increase. Therefore, next, a description will be given for case where an interpolation rate of an interpolation frame is controlled on the basis of a shake amount detected from original frames.

Note that although a second embodiment is different from the first embodiment in a point that the interpolation rate control unit 105 determines a target interpolation rate on the basis of a shake amount detected from original frames in the signal processing device 10 of FIG. 1, other configurations of the second embodiment are similar to those in the first embodiment, and therefore, descriptions of overlapping parts will be omitted as appropriate.

(Shake Detection Method and Interpolation Rate Determination Method)

FIG. 8 is a diagram illustrating examples of a shake detection method based on a motion vector and a target interpolation rate determination method depending on a result of the shake detection.

As illustrated in FIG. 8, there are two types of detection items detected from original frames, for example, the shake of an entire screen image and the shake of an object.

For the detection of the shake of the entire screen image, for example, the following detection method can be used. That is, it is determined that the entire screen image is shaking in a case where there is, among four types of combination including diagonal directions, i.e., left and right directions, upper left and lower right directions, upper and lower directions, and upper right and lower left directions, a combination in which high and low levels of motion vector amounts of the entire screen image are reversed in every several V (Vertical Sync).

Furthermore, here, a shake amount of the entire screen image can be obtained from the motion vector amount of the combination with which the entire screen image is determined to be shaking. That is, the shake amount, which is a total sum of shakes in a combination of specific diagonal directions, is calculated on the basis of the motion vector amount obtained for each combination of predetermined diagonal directions in the entire screen image.

In such a case, the interpolation rate control unit 105 determines the target interpolation rate depending on the detected shake amount of the entire screen image.

Furthermore, for the detection of the shake of the object, for example, the following detection method can be used. That is, a shake amount T, which is largest among the shake amounts in the above four types of combination (combinations of left and right directions, upper left and lower right directions, upper and lower directions, and upper right and lower left directions), can be employed as a shake amount T' of the object, but here, a value thereof is translated (converted) into a value for the entire screen image.

Similarly to the case of the motion vector total sum of the object described above, it is possible to calculate a ratio of an area corresponding to the object (moving object) to the entire screen image by detecting an area which accounts for A % of the area of the entire screen image, for example, and therefore, the shake amount T can be converted into the shake amount T' of the object by using the ratio. More specifically, the shake amount T' of the object satisfies a relationship of the following formula (2).

$$T'=T\times 100/(100-A) \quad (2)$$

In such a case, the interpolation rate control unit 105 determines the target interpolation rate depending on the detected shake amount T' of the object.

Note that although the shake of the entire screen image and the shake of the object have been described as detection items here, the target interpolation rate can be determined depending on at least one of the shake amount of the entire screen image or the shake amount of the object. The shake of the entire screen image and the shake of the object are merely examples of parameters depending on video scenes, and other parameters may be used.

(Second Interpolation Rate Control Process)

Figure 9:
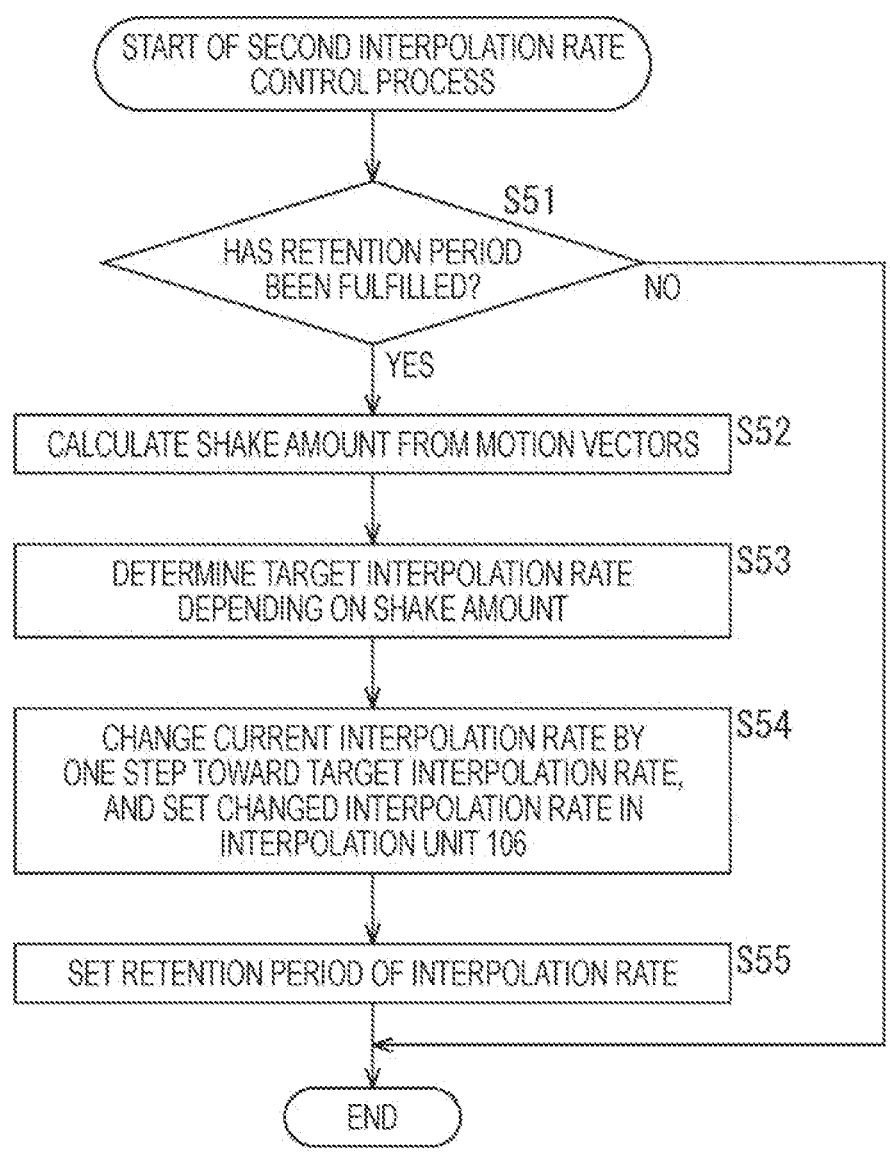
FIG. 9 is a flowchart explaining a flow of a second interpolation rate control process.

FIG. 9 is a flowchart explaining a flow of a second interpolation rate control process executed by the interpolation rate control unit 105 of FIG. 1.

In steps S51 to S55, processes of controlling the interpolation rate are executed similarly to steps S11 to S15 of FIG. 3, but a difference therefrom resides in that in step S53, a shake amount obtained from motion vectors is used instead of the motion vector total sum obtained from motion vectors when determining the target interpolation rate.

That is, in the second interpolation rate control process, if the processes of steps S51 to S55 are repeated at a predetermined timing such as 1 V and a predetermined retention period such as 10 V has been fulfilled ("YES" in S51), a target interpolation rate depending on the shake amount is determined (S53), the current interpolation rate is changed stepwise, one step at a time, so as to gradually approach the target interpolation rate, and the changed interpolation rate is set in the interpolation unit 106 (S54).

The flow of the second interpolation rate control process has been described above. In this second interpolation rate control process, when an interpolation frame is generated for the original frames along the time axis, the interpolation rate of the interpolation frame is controlled depending on the motion between the original frames. More specifically, when controlling the interpolation rate, the target interpolation rate is determined on the basis of the shake amount detected from the original frames, and the interpolation rate is controlled on the basis of the determined target interpolation rate.

As described above, in the second embodiment, it is possible to perform control so that not only the motion of the entire screen image or the motion of the object, but also the shake of the entire screen image or the shake of the object is detected, and the interpolation rate is changed in order to maintain the impression of the scene such as sense of speed and a sense of urgency.

3. Modifications

In the above description, the signal processing device 10 has been described as an independent device, but a configuration may be adopted in which the signal processing device 10 is included in a device such as a display device.

(Example Configuration of Display Device)

Figure 10:
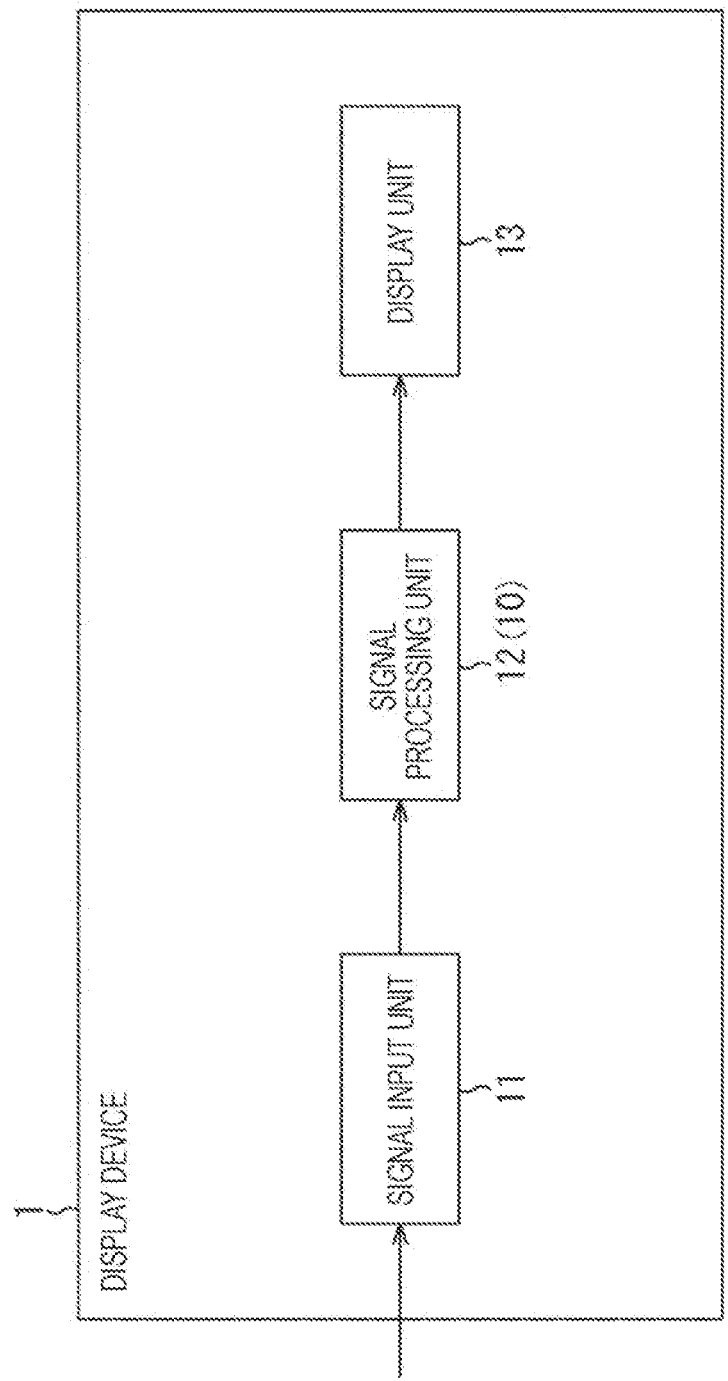
FIG. 10 is a block diagram illustrating an example configuration of a display device to which the present technology is applied.

FIG. 10 is a block diagram illustrating an example configuration of a display device to which the present technology is applied.

A display device 1 is a device which includes a display unit, for example, a television receiver, display equipment, a personal computer, a tablet terminal, a smartphone, a mobile phone, a head-mounted display, a game machine, or the like.

In FIG. 10, the display device 1 includes a signal input unit 11, a signal processing unit 12, and a display unit 13.

The signal input unit 11 is configured as, for example, a tuner, and supplies a video signal obtained by demodulating a broadcast signal received via an antenna to the signal processing unit 12. The broadcast signal here includes, for example, a video signal of broadcast content transmitted in accordance with a predetermined broadcasting method such as terrestrial broadcasting or satellite broadcasting.

Note that the signal input unit 11 is not limited to the tuner, and may be configured, for example, as a communication module, and a video signal of communication content distributed via a communication network such as the internet may be input to the signal processing unit 12.

Furthermore, the signal input unit 11 may be configured, for example, as an interface in conformity with a predetermined standard such as High Definition Multimedia Interface (HDMI) (registered trademark) or universal serial bus (USB), and a video signal of recorded content recorded on a recorder, or a video signal of recorded content recorded on a recording medium such as an optical disk or a semiconductor memory may be input to the signal processing unit 12.

Note that the broadcast content, the communication content, the recorded content, and the like described above are merely examples of content, and video signals of various types of content can be converted into digital component signals YUV and input to the signal processing unit 12.

The signal processing unit 12 has a configuration corresponding to the signal processing device 10 of FIG. 1. The signal processing unit 12 executes the interpolation rate control process (FIG. 3 or 9) and the interpolation process (FIG. 6) on the video signal (digital component signal YUV) supplied from the signal input unit 11. The video signal in which the interpolation frame is inserted between the original frames by the interpolation rate control process and the interpolation process is supplied to the display unit 13.

The display unit 13 includes, for example, a liquid crystal display unit such as a liquid crystal display (LCD), a self-luminous display unit such as an organic light-emitting diode (OLED), or the like. The display unit 13 is driven, for example, by converting the video signal supplied from the signal processing unit 12 into an RGB signal as needed, and displays a video (image) corresponding to the video signal.

Note that in the display device 1 of FIG. 10, only a video signal sequence is illustrated for simplification of the explanation, but an audio signal sequence may be included and a sound synchronized with a video of the content may be output.

(Example Configuration of Processing Device)

Figure 11:
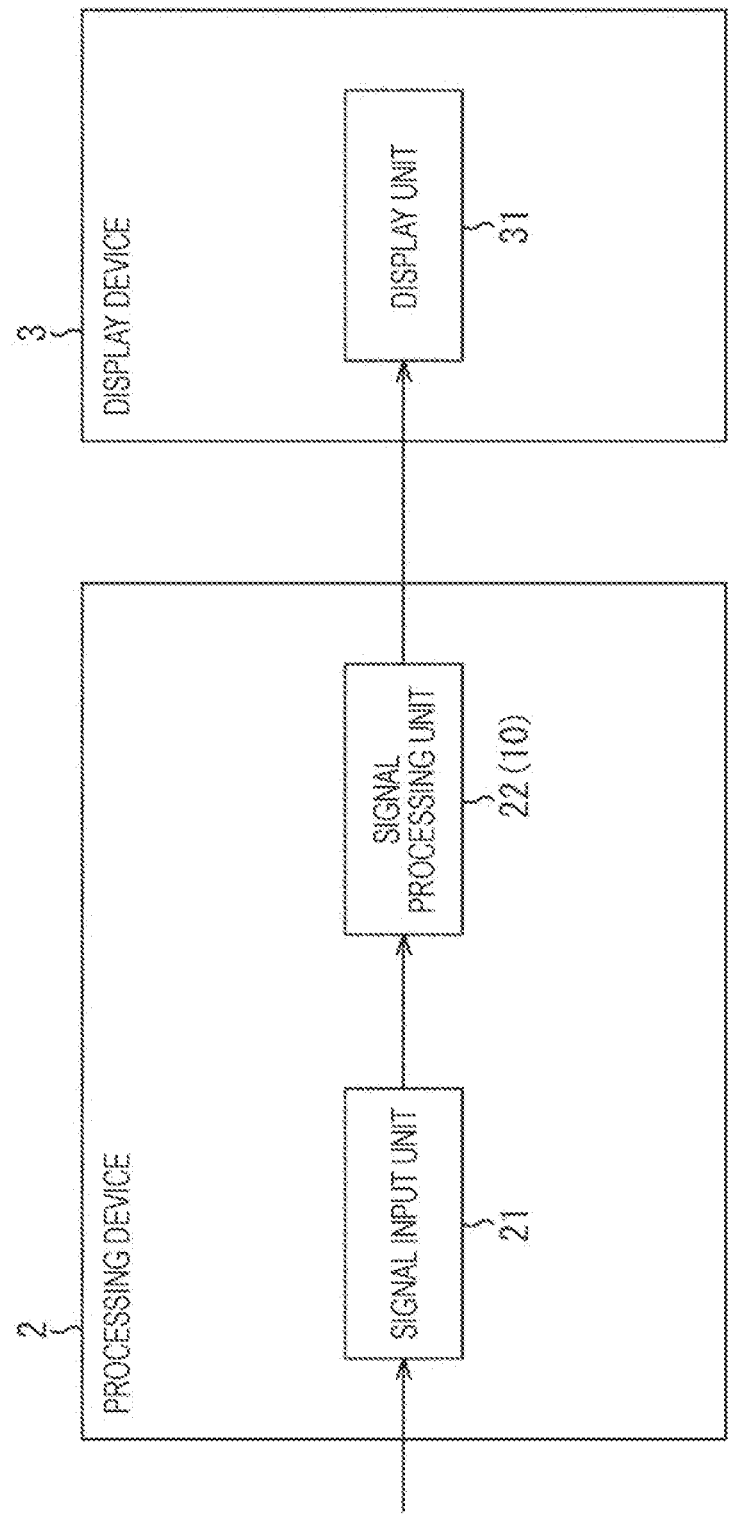
FIG. 11 is a block diagram illustrating an example configuration of a processing device to which the present technology is applied.

FIG. 11 is a block diagram illustrating an example configuration of a display system to which the present technology is applied.

In FIG. 11, the display system includes a processing device 2 and a display device 3. The processing device 2 is, for example, a device such as a set-top box, a recorder, a player, or a storage device. Furthermore, the display device 3 is, for example, a device such as display equipment, a television receiver, a tablet terminal, or a personal computer.

Note that the processing device 2 and the display device 3 are connected by a cable or the like via an interface in conformity with a predetermined standard.

In FIG. 11, the processing device 2 includes a signal input unit 21 and a signal processing unit 22.

The signal input unit 21 is configured as, for example, a tuner, a communication module, or an interface in conformity with a predetermined standard such as HDMI (registered trademark) or USB, converts a video signal into a digital component signal YUV, and inputs the signal to the signal processing unit 22.

The signal processing unit 22 has a configuration corresponding to the signal processing device 10 of FIG. 1. The signal processing unit 22 executes the interpolation rate control process (FIG. 3 or 9) and the interpolation process (FIG. 6) on the video signal (digital component signal YUV) supplied from the signal input unit 21. The video signal in which the interpolation frame is inserted between the original frames by the interpolation rate control process and the interpolation process is output to the display device 3 via a predetermined interface such as a cable. In such a case, the configuration of the signal processing unit 22 includes a processing part which performs signal conversion suitable for the predetermined interface on the digital component signal YUV.

Furthermore, in FIG. 11, the display device 3 includes a display unit 31.

The display unit 31 includes, for example, a liquid crystal display unit such as an LCD, a self-luminous display unit such as an OLED, or the like. The display unit 31 is driven on the basis of the video signal input from the processing device 2, and displays a video (image) corresponding to the video signal.

Note that in FIG. 11, the processing device 2 and the display device 3 are connected via the predetermined interface such as a cable, but there is no limitation thereto, and for example, video signals may be exchanged in accordance with a communication method in conformity with a predetermined standard.

(Other Configurations)

Note that in the above description, the case where the target interpolation rate is determined on the basis of the motion amount of the entire screen image or the object detected from the motion vectors of the original frames has been described in the first embodiment, and the case where the target interpolation rate is determined on the basis of the shake amount of the entire screen image or the object detected from the motion vectors of the original frames has been described in the second embodiment, but the target interpolation rate may be determined on the basis of the motion amount and the shake amount of the entire screen image or the object. That is, the interpolation rate control unit 105 can determine the target interpolation rate on the basis of at least one of the motion amount or the shake amount detected from the original frames, and can control the interpolation rate stepwise so as to gradually approach the determined target interpolation rate.

4. Configuration of Computer

Figure 12:
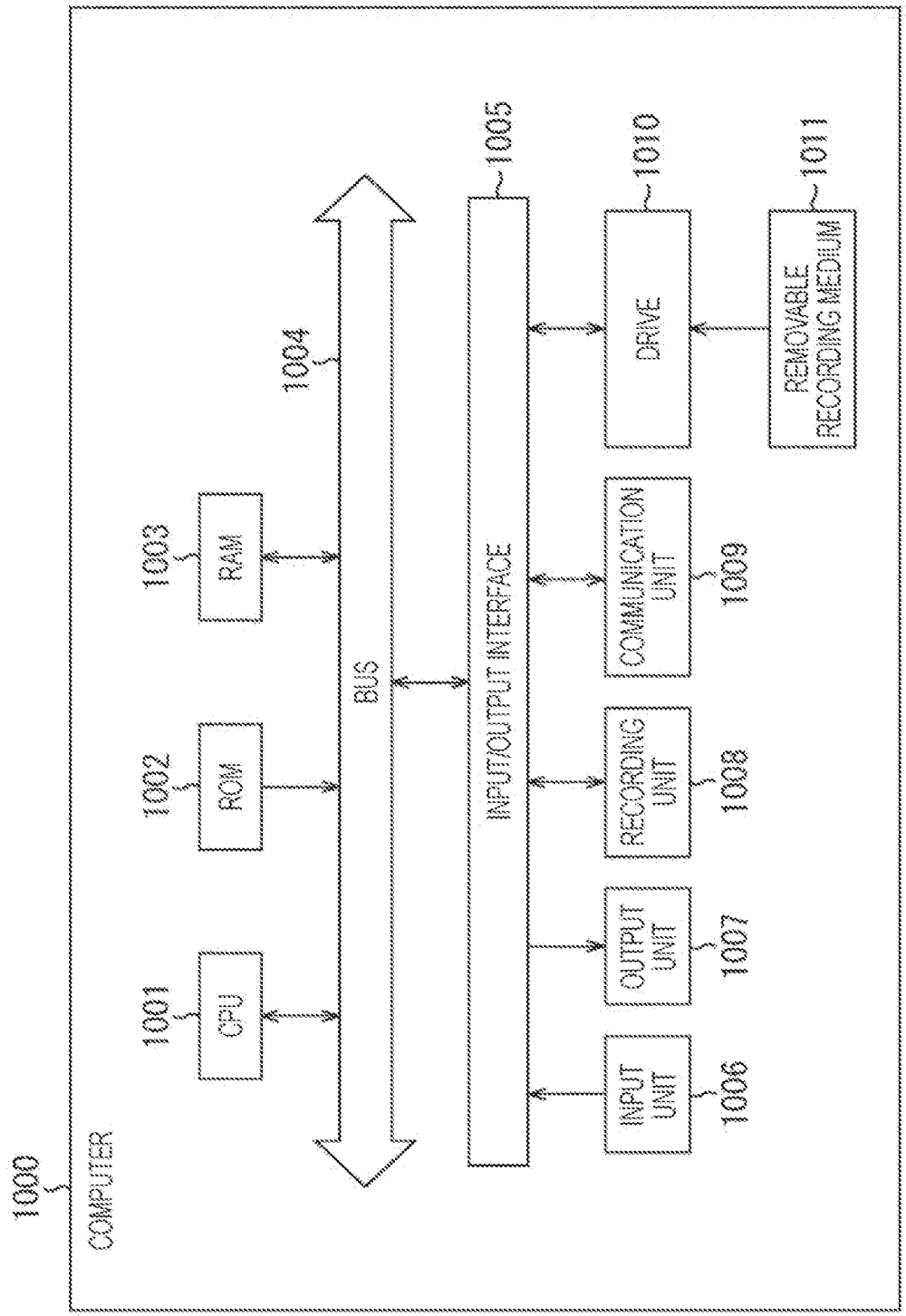
FIG. 12 is a diagram illustrating an example configuration of a computer.

The series of processes described above (for example, the interpolation rate control process illustrated in FIG. 3 or 9) can either be executed by hardware or software. In a case where the series of processes is executed by software, a program included in the software is installed on a computer of each device. FIG. 12 is a block diagram illustrating an example configuration of hardware of a computer which is caused to execute the series of processes by a program.

In a computer 1000, a central processing unit (CPU) 1001, a read only memory (ROM) 1002, and a random access memory (RAM) 1003 are connected to one another by a bus 1004. An input/output interface 1005 is further connected to the bus 1004. An input unit 1006, an output unit 1007, a recording unit 1008, a communication unit 1009, and a drive 1010 are connected to the input/output interface 1005.

The input unit 1006 includes a microphone, a keyboard, a mouse, and the like. The output unit 1007 includes a speaker, a display, and the like. The recording unit 1008 includes a hard disk, a non-volatile memory, and the like. The communication unit 1009 includes a network interface and the like. The drive 1010 drives a removable recording medium 1011 such as a magnetic disk, an optical disk, a magneto-optical disk, or a semiconductor memory.

In the computer 1000 configured as described above, the above series of processes is performed by the CPU 1001 loading a program recorded in the ROM 1002 or the recording unit 1008 to the RAM 1003 via the input/output interface 1005 and the bus 1004, and executing the program.

The program executed by the computer 1000 (CPU 1001) can be recorded, for example, in the removable recording medium 1011 as a package medium or the like and provided. Furthermore, the program can be provided via a wired or wireless transmission medium such as a local area network, the internet, or digital satellite broadcasting.

In the computer 1000, the program can be installed in the recording unit 1008 via the input/output interface 1005 by inserting the removable recording medium 1011 into the drive 1010. Furthermore, the program can be received by the communication unit 1009 via the wired or wireless transmission medium and installed in the recording unit 1008. Besides, the program can be installed in advance in the ROM 1002 or the recording unit 1008.

Here, in the present description, the processes performed by the computer in accordance with the program do not necessarily have to be performed in time series in the order described as the flowcharts. That is, in the processes performed by the computer according to the program, a process executed in parallel or individually (for example, a parallel process or an object-based process) is also included. Furthermore, the program may be processed by one computer (processor) or may be processed by a plurality of computers in a distributed manner.

Note that the embodiment of the present technology is not limited to the embodiments described above. Various modifications may be made without departing from the gist of the present technology.

Furthermore, each step of the interpolation rate control process illustrated in FIG. 3 or FIG. 9 can be executed by one device, and in addition, can be shared and executed by a plurality of devices. Moreover, in a case where a plurality of processes is included in one step, the plurality of processes included in the one step can be executed by one device, and in addition, can be shared and executed by a plurality of devices.

Note that the present technology may have the following configurations.

(1)

A display device including:

a signal processing unit that, when an interpolation frame is generated for original frames along a time axis, the interpolation frame interpolating between the original frames, controls an interpolation rate of the interpolation frame depending on motion between the original frames in a certain direction.

(2)

The display device according to the above-described (1), in which the signal processing unit determines a target interpolation rate that is a target of the interpolation rate on the basis of a motion amount detected from the original frames, and controls the interpolation rate on the basis of the target interpolation rate that has been determined.

(3)

The display device according to the above-described (2), in which the signal processing unit changes the interpolation rate stepwise so as to gradually approach the target interpolation rate that has been determined.

(4)

The display device according to the above-described (3), in which the signal processing unit changes the target interpolation rate on the basis of a motion amount detected from the original frames, and changes the interpolation rate stepwise so as to gradually approach the target interpolation rate that has been changed.

(5)

The display device according to any one of the above-described (2) to (4), in which the signal processing unit performs control so that generation of the interpolation frame using the interpolation rate that has been changed is continuously performed for a predetermined period.

(6)

The display device according to any one of the above-described (2) to (5), in which the signal processing unit changes an interpolation rate range that is a range in which the interpolation rate is changeable, depending on a type of content including the original frames.

(7)

The display device according to the above-described (2), in which the signal processing unit calculates a motion vector total sum in a specific direction on the basis of motion vectors obtained in each predetermined direction in an entire screen image corresponding to the original frames, and determines the target interpolation rate depending on the motion vector total sum that has been calculated.

(8)

The display device according to the above-described (2) or (7), in which the signal processing unit calculates, on the basis of motion vectors obtained in each predetermined direction in an entire screen image corresponding to the original frames, a motion vector total sum of an object in a specific direction in a predetermined area corresponding to the entire screen image, and determines the target interpolation rate depending on the motion vector total sum of the object that has been calculated.

(9)

The display device according to any one of the above-described (1) to (8), in which the signal processing unit determines a target interpolation rate that is a target of the interpolation rate on the basis of a shake amount detected from the original frames, and controls the interpolation rate on the basis of the target interpolation rate that has been determined.

(10)

The display device according to the above-described (9), in which the signal processing unit calculates, on the basis of a motion vector amount obtained for each combination of predetermined diagonal directions in an entire screen image corresponding to the original frames, a shake amount that is a total sum of shakes in a combination of specific diagonal directions, and determines the target interpolation rate depending on the shake amount that has been calculated.

(11)

The display device according to the above-described (9) or (10), in which the signal processing unit calculates, on the basis of a motion vector amount obtained for each combination of predetermined diagonal directions in an entire screen image corresponding to the original frames, a shake amount that is a total sum of shakes of an object in a combination of specific diagonal directions in a predetermined area corresponding to the entire screen image, and determines the target interpolation rate depending on the shake amount of the object that has been calculated.

(12)

The display device according to any one of the above-described (1) to (11), in which the interpolation rate includes a rate that indicates a degree of interpolation of the interpolation frame.

(13)

The display device according to the above-described (12), in which the interpolation rate has a relationship in which in a case where the interpolation rate is defined as 100% when one or a plurality of the interpolation frames is generated assuming that a positional change between the original frames has occurred in an even movement, and the interpolation rate is defined as 0% when the interpolation frames become identical with the original frames, the interpolation frames are further approximated to the original frames as the interpolation rate is lowered.

(14)

The display device according to any one of the above-described (1) to (13), in which the signal processing unit includes:

an interpolation rate control unit that controls the interpolation rate; and an interpolation unit that generates the interpolation frame using the interpolation rate and interpolates between the original frames.

(15)

The display device according to the above-described (14), in which the signal processing unit further includes a motion vector detection unit that detects a motion vector from the original frames, and the interpolation rate control unit controls the interpolation rate on the basis of the motion vector that has been detected.

(16)

The display device according to any one of the above-described (1) to (15), further including a display unit that displays a video of content including the original frames.

(17)

A signal processing device including:

an interpolation rate control unit that, when an interpolation frame is generated for original frames along a time axis, the interpolation frame interpolating between the original frames, controls an interpolation rate of the interpolation frame depending on motion between the original frames in a certain direction.

(18)

A signal processing method in which when an interpolation frame is generated for original frames along a time axis, the interpolation frame interpolating between the original frames, a signal processing device controls an interpolation rate of the interpolation frame depending on motion between the original frames in a certain direction.

REFERENCE SIGNS LIST

1 Display device
2 Processing device
3 Display device
10 Signal processing device
11 Signal input unit
12 Signal processing unit
13 Display unit
21 Signal input unit
22 Signal processing unit
31 Display unit
101 Pre-processing unit
102 Memory control unit
103 Memory
104 Motion vector detection unit
105 Interpolation rate control unit
106 Interpolation unit
1000 Computer
1001 CPU

The invention claimed is:

1. A display device comprising:
a signal processor configured to control, when an interpolation frame is generated for original frames along a time axis, the interpolation frame interpolating between the original frames, an interpolation rate of the interpolation frame depending on motion between the original frames in a certain direction.

2. The display device according to claim 1,
wherein the signal processor is configured to change an interpolation rate range that is a range in which the interpolation rate is changeable, depending on a type of content including the original frames.

3. The display device according to claim 1,
wherein the signal processor is configured to:
determine a target interpolation rate that is a target of the interpolation rate on a basis of a motion amount detected from the original frames by calculating a motion vector total sum in a specific direction on a basis of motion vectors obtained in each predetermined direction in an entire screen image corresponding to the original frames, and
determining the target interpolation rate depending on the motion vector total sum that has been calculated, and
control the interpolation rate on a basis of the target interpolation rate that has been determined.

4. The display device according to claim 1,
wherein the signal processor is configured to:
determine a target interpolation rate that is a target of the interpolation rate on a basis of a motion amount detected from the original frames by calculating, on a basis of motion vectors obtained in each predetermined direction in an entire screen image corresponding to the original frames, a motion vector total sum of an object in a specific direction in a predetermined area corresponding to the entire screen image, and determining the target interpolation rate depending on the motion vector total sum of the object that has been calculated, and control the interpolation rate on a basis of the target interpolation rate that has been determined.

5. The display device according to claim 1, wherein the signal processor is configured to:

determine a target interpolation rate that is a target of the interpolation rate on a basis of a shake amount detected from the original frames, and control the interpolation rate on a basis of the target interpolation rate that has been determined.

6. The display device according to claim 5, wherein the signal processor is configured to:

calculate, on a basis of a motion vector amount obtained for each combination of predetermined diagonal directions in an entire screen image corresponding to the original frames, a shake amount that is a total sum of shakes in a combination of specific diagonal directions, and determine the target interpolation rate depending on the shake amount that has been calculated.

7. The display device according to claim 5, wherein the signal processor is configured to:

calculate, on a basis of a motion vector amount obtained for each combination of predetermined diagonal directions in an entire screen image corresponding to the original frames, a shake amount that is a total sum of shakes of an object in a combination of specific diagonal directions in a predetermined area corresponding to the entire screen image, and determine the target interpolation rate depending on the shake amount of the object that has been calculated.

8. The display device according to claim 1, wherein the interpolation rate includes a rate that indicates a degree of interpolation of the interpolation frame.

9. The display device according to claim 8, wherein the interpolation rate has a relationship in which in a case where the interpolation rate is defined as 100% when one or a plurality of the interpolation frames is generated assuming that a positional change between the original frames has occurred in an even movement, and the interpolation rate is defined as 0% when the interpolation frames become identical with the original frames, the interpolation frames are further approximated to the original frames as the interpolation rate is lowered.

10. The display device according to claim 1, wherein the signal processor comprises:

an interpolation rate control unit configured to control the interpolation rate; and an interpolation unit configured to generate the interpolation frame using the interpolation rate and interpolates between the original frames.

11. The display device according to claim 1, further comprising a display unit configured to display a video of content including the original frames.

12. A signal processing device comprising:

an interpolation rate control unit configured to control, when an interpolation frame is generated for original frames along a time axis, the interpolation frame interpolating between the original frames, an interpolation rate of the interpolation frame depending on motion between the original frames in a certain direction.

13. A signal processing method of a display device, wherein when an interpolation frame is generated for original frames along a time axis, the interpolation frame interpolating between the original frames, the method comprises:

controlling an interpolation rate of the interpolation frame depending on motion between the original frames in a certain direction.

14. The signal processing method according to claim 13, wherein when the interpolation frame is generated for the original frames along the time axis, the method comprises:

changing an interpolation rate range that is a range in which the interpolation rate is changeable, depending on a type of content including the original frames.

15. The signal processing method according to claim 13, wherein when the interpolation frame is generated for the original frames along the time axis, the method comprises:

determining a target interpolation rate that is a target of the interpolation rate on a basis of a motion amount detected from the original frames by calculating a motion vector total sum in a specific direction on a basis of motion vectors obtained in each predetermined direction in an entire screen image corresponding to the original frames, and determining the target interpolation rate depending on the motion vector total sum that has been calculated, and controlling the interpolation rate on a basis of the target interpolation rate that has been determined.

16. The signal processing method according to claim 13, wherein when the interpolation frame is generated for the original frames along the time axis, the method comprises:

determining a target interpolation rate that is a target of the interpolation rate on a basis of a motion amount detected from the original frames by calculating, on a basis of motion vectors obtained in each predetermined direction in an entire screen image corresponding to the original frames, a motion vector total sum of an object in a specific direction in a predetermined area corresponding to the entire screen image, and determining the target interpolation rate depending on the motion vector total sum of the object that has been calculated, and controlling the interpolation rate on a basis of the target interpolation rate that has been determined.

17. The signal processing method according to claim 13, wherein when the interpolation frame is generated for the original frames along the time axis, the method comprises:

determining a target interpolation rate that is a target of the interpolation rate on a basis of a shake amount detected from the original frames, and controlling the interpolation rate on a basis of the target interpolation rate that has been determined.

18. The signal processing method according to claim 17, wherein when the interpolation frame is generated for the original frames along the time axis, the method comprises:

calculating, on a basis of a motion vector amount obtained for each combination of predetermined diagonal directions in an entire screen image corresponding to the original frames, a shake amount that is a total sum of shakes in a combination of specific diagonal directions, and determining the target interpolation rate depending on the shake amount that has been calculated.

19. The signal processing method according to claim 17, wherein when the interpolation frame is generated for the original frames along the time axis, the method comprises:

calculating, on a basis of a motion vector amount obtained for each combination of predetermined diagonal directions in an entire screen image corresponding to the original frames, a shake amount that is a total sum of shakes of an object in a combination of specific diagonal directions in a predetermined area corresponding to the entire screen image, and determining the target interpolation rate depending on the shake amount of the object that has been calculated.

20. The signal processing method according to claim 13, wherein the interpolation rate includes a rate that indicates a degree of interpolation of the interpolation frame.

\* \* \* \* \*